US005739619A

United States Patent [19]

Thornley

[11] Patent Number: 5,739,619

[45] Date of Patent: Apr. 14, 1998

[54] ELECTRICAL BRUSH HAVING A WEAR INDICATOR

[75] Inventor: George C. Thornley, Wadmalaw Island, S.C.

[73] Assignee: Life Cycle Engineering, Inc., North Charleston, S.C.

[21] Appl. No.: 618,526

[22] Filed: Mar. 19, 1996

[51] Int. Cl.[6] .................... H02K 13/00

[52] U.S. Cl. .................... 310/248; 310/251; 310/252; 310/245

[58] Field of Search .................... 310/251, 252, 310/245, 249, 253, 248

[56] References Cited

U.S. PATENT DOCUMENTS

| | | | |
|---|---|---|---|
| 3,392,295 | 7/1968 | Sebok | 310/253 |
| 4,034,249 | 7/1977 | Avery | 310/253 |
| 4,075,524 | 2/1978 | Bradshaw et al. | 310/249 |
| 4,316,186 | 2/1982 | Purdy et al. | 340/648 |
| 4,536,670 | 8/1985 | Mayer | 310/249 |

*Primary Examiner*—Clayton E. LaBalle
*Assistant Examiner*—Timothy A. J. Williams
*Attorney, Agent, or Firm*—B. Craig Killough

[57] ABSTRACT

An electrical brush having a wear indicator in the form of a marking substance within the brush which removes a film from a rotating collector surface of an electrical device just prior to the brush becoming worn to its minimum length. The removal of the film leaves a bright streak on the collector surface, and provides a visual indication that the brush is in need of replacement.

14 Claims, 4 Drawing Sheets

ELECTRICAL BRUSH HAVING A WEAR INDICATOR

FIELD OF THE INVENTION

This invention relates to electrical motor or generator brushes generally, and is more specifically directed to an electrical brush having a material therein which marks a collector surface when the electrical brush has worn to a predetermined minimum length.

BACKGROUND OF THE INVENTION

Electrical brushes are devices for conducting electrical current to and from a rotating part. Electrical brushes are commonly retained by brush holders or boxes in which a spring biasing presses the brush material against the moving commutator surface on direct current (DC) machines, or slip rings on alternating current (AC) machines. Hereinafter, the term "collector surface" means a commutator surface or a slip ring.

A typical DC machine will have one or more pairs of brackets, with multiple brush holders per bracket. For example, a 500 kW AC to DC, DC to AC motor generator on a nuclear submarine has eight brackets, with five holders per bracket, for a total of forty brushes.

Typically, brushes are constructed of carbon. The brush is contained within the holder, but in most applications, the brush moves freely within the holder. The brush is electrically connected to the holder by means of a flexible wire called a shunt. A spring assembly presses the brush against the rotating collector surface. The brush rides on a film on the collector surface that is comprised of copper oxide, graphitic oxide and moisture. An ideal collector surface film may be described as chocolate brown in color.

In a collector surface/brush material interface, the brush is sacrificial. The brushes wear, and must be replaced when they reach a predetermined minimum length. Brushes must be replaced prior to rivets or imbedded shunts coming in contact with collector surface, or catastrophic damage will result to the collector surface, and commonly, to the machine.

There are several existing methods for determining when a brush has reached its minimum length. These include:

1. Devices which are positioned on the brush holder that produce a visual or electrical signal when the brush has reached minimum length.
2. Imbedded electrical wires that produce a signal when the brush wears to a point that the insulation of the imbedded wire wears away.
3. A marker on the shunt that visually approximates to maintenance personnel when a brush has worn to a point which requires replacement. The marker is visually compared with a relative position on the top of the holder. This method is not accurate.
4. Most commonly, the machine is shut down, the brushes are removed and measured with a ruler. This method is time consuming, and requires machine down time.

Very few DC or AC machines have electrical circuits that indicate when a brush has reached minimum length. Most electrical machines have access covers with transparent viewing windows. Maintenance personnel for most electrical machines having brushes are required by management, or by experience, to physically remove and measure brushes on a regular basis, usually monthly, and to visually examine operating machines on a daily basis to ensure satisfactory operation. Maintenance personnel are taught to look for obvious signs of problems such as:

sparking at the trailing edge of the brush;

a brush which appears to be approaching minimum length; or discoloration of the collector surface film.

SUMMARY OF THE INVENTION

The present invention is an electrical brush having a marking substance which is present within a void in an upper portion of the brush. As the brush wears, the marking substance is exposed, and comes into contact with the collector surface. The marking substance removes the surface film, exposing highly visible, bright streaks from the rotating collector surface. When the bright streaks are observed, visual indication is given that it is necessary to replace the brush.

DESCRIPTION OF THE PREFERRED EMBODIMENT

Figure 1:
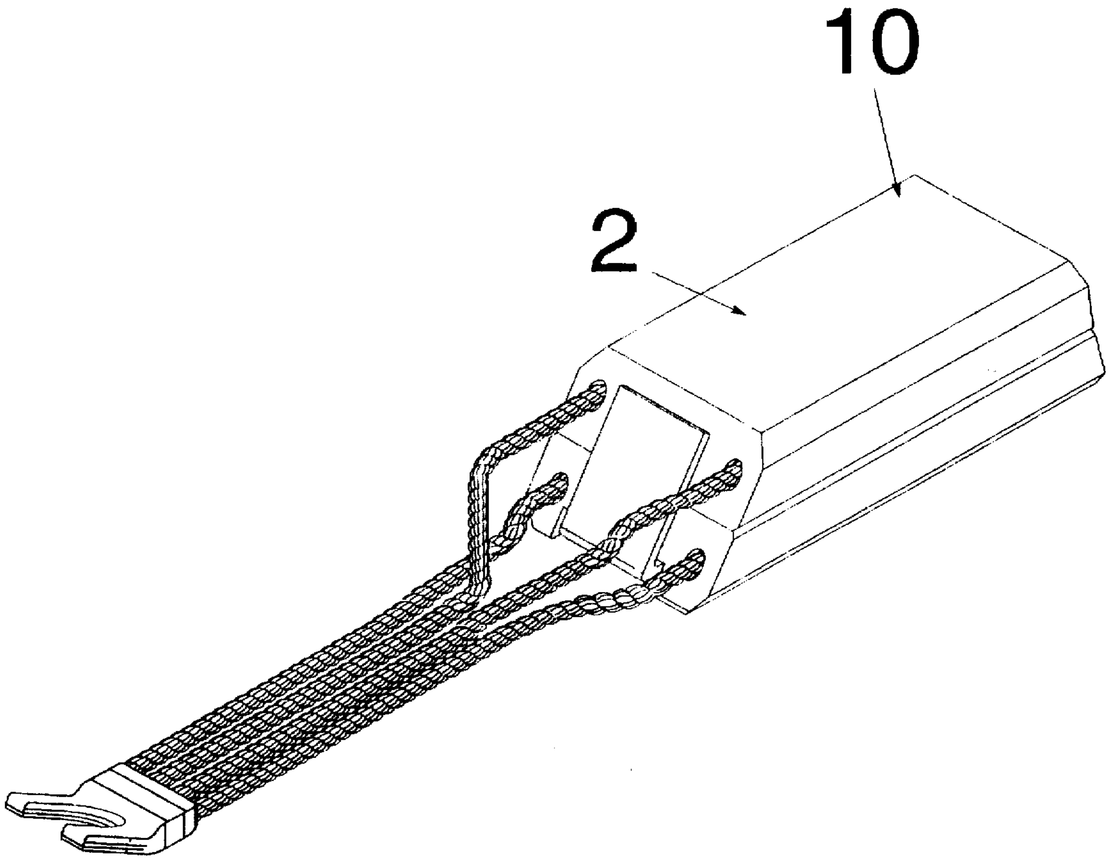
FIG. 1 is a perspective view of a typical carbon brush.
Figure 2:
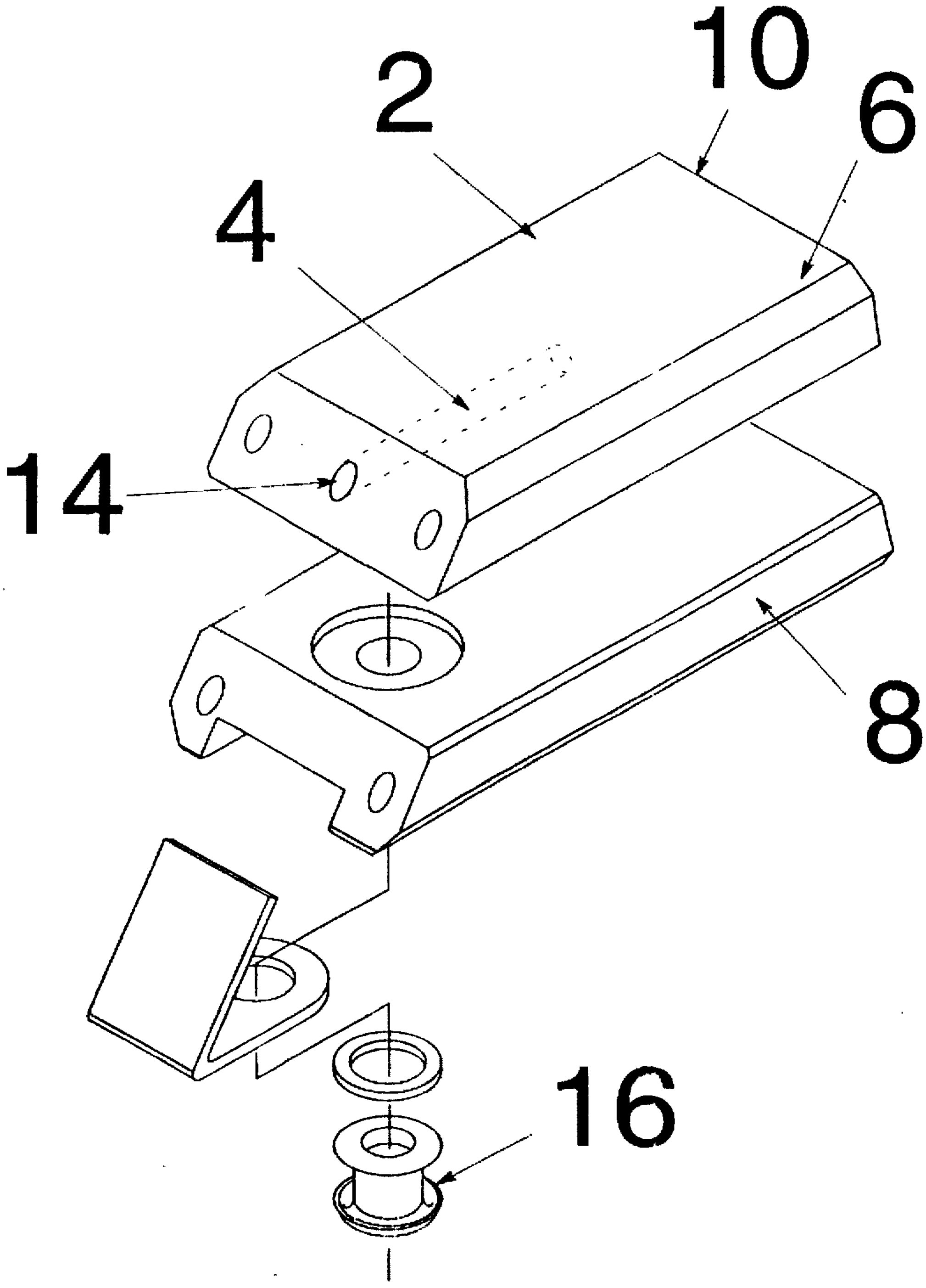
FIG. 2 is an exploded view of a typical electrical brush, with the marking substance shown therein.

Referring now to the drawing figures, FIG. 1 shows a multi-wafered brush 2. The brush may be a carbon brush.

Figure 3:
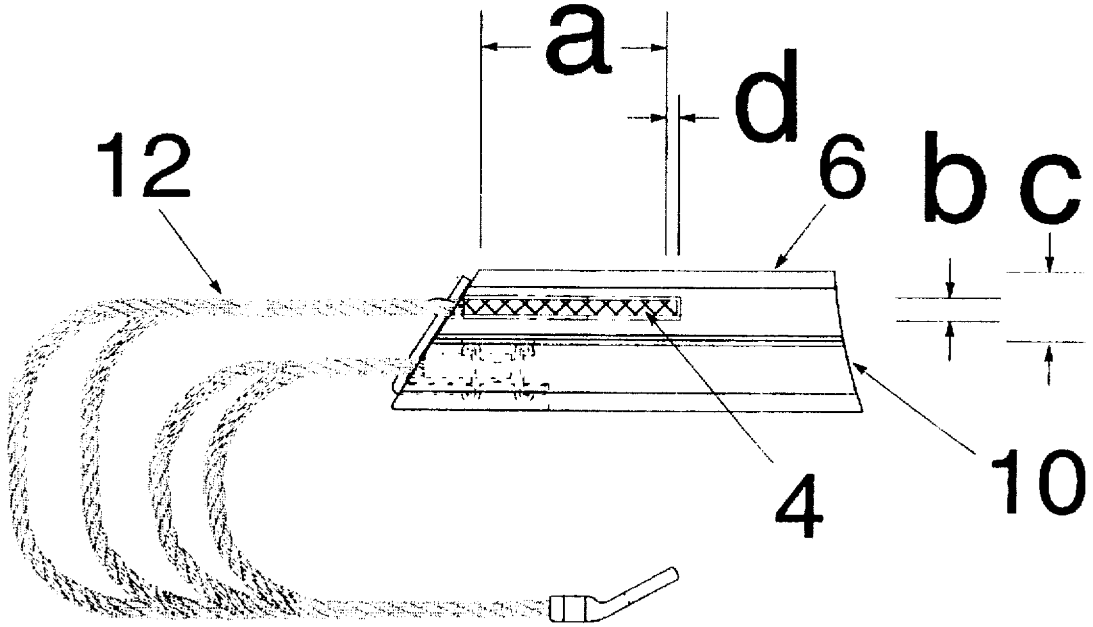
FIG. 3 is a side elevation of a typical electrical brush, showing the marking substance therein.
Figure 4:
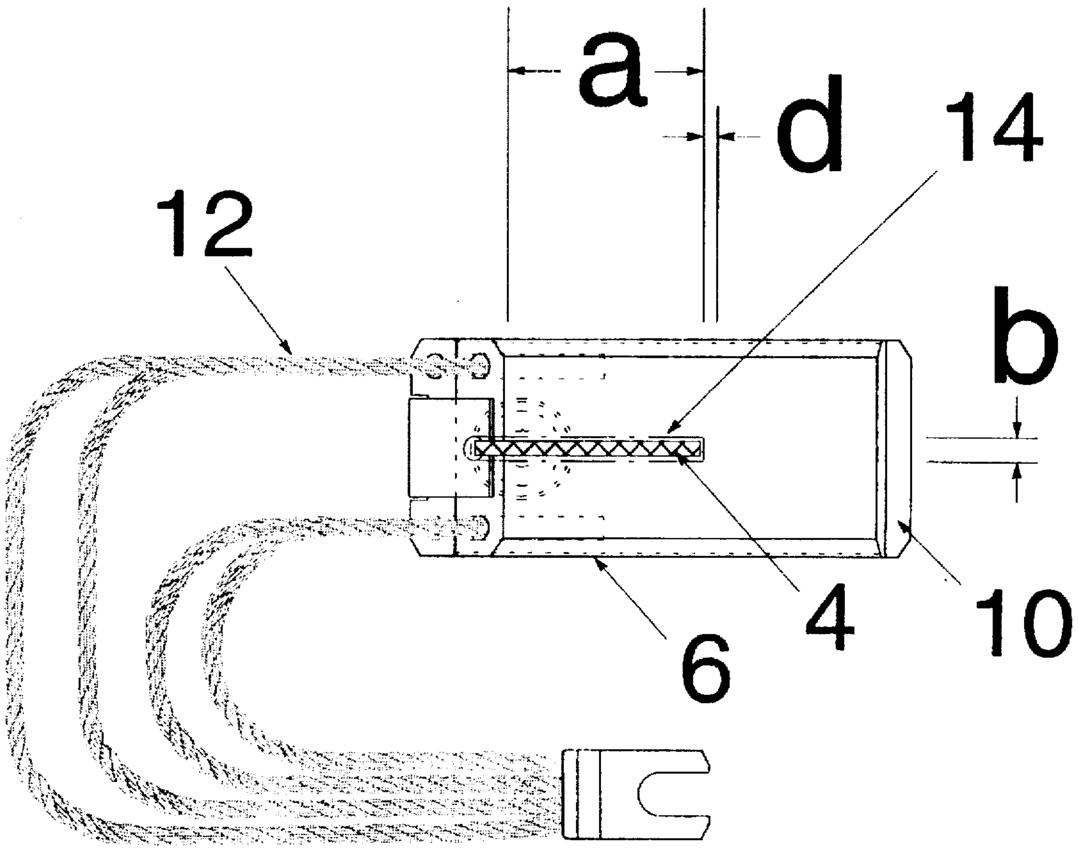
FIG. 4 is a top, plan view of a typical electrical brush showing the marking substance therein.

The brush has a marking substance 4 contained within, or embedded in, the brush. As shown in FIG. 1, the brush is multi-wafered, with the marking substance present within the first wafer 6. The marking substance could be present in the second wafer 8. The marking substance is present in an upper portion of the brush. The upper portion of the brush is defined as the portion which includes the end of the brush which is opposite the end 10 of the brush which contacts the collector surface. The lower portion of the brush is defined as the portion of the brush which includes the end 10 of the brush which contacts the collector surface. Typically, a shunt 12 is attached to the upper surface of the brush, as shown in FIGS. 3 and 4. If the brush is multi-wafered, the wafers are connected by one of more fasteners, which may be conductive, such as a rivet 16.

A void 14 is drilled or formed in an upper portion of the brush. The marking substance is placed within the void.

For most brushes, the manufacturer of the brush or the machine will specify a minimum length. An example of a minimum length a is indicated in FIGS. 3 and 4. Once the brush is worn to less than the minimum length, the brush should be replaced. Accordingly, the void extends from an upper portion of the brush, toward the lower portion of the brush. The void and the marking substance should extend from the upper portion of the brush to a distance d, which is just past the point of the brush which establishes the minimum brush length. Accordingly, marking of the collector surface will occur before the brush wears to its minimum length, and will continue until the brush is replaced. The amount of time in advance of the brush wearing to its minimum length that the marking begins is determined by the particular application, and by the distance which the marking substance extends past the minimum brush length.

The particular cross sectional dimension of the void 14, such as a diameter b, will be dictated by the thickness c of the brush, or wafer of the brush in which the marking substance is located. It is preferred that the diameter of the void, and therefore, the marking substance located therein, be sufficient to produce an easily visible bright streak on the collector surface as a minimum diameter, and be less than one-third (1/3) of the thickness of the brush or wafer as a maximum diameter.

The marking substance is non conductive. The marking substance, which is preferred to be a combination of a resilient material and an abrasive material, can be a number of different substances. Substances demonstrated to mark the collector surface by removing the film to bare metal without harming the collector surface are:

A solidified mixture of fine silica sand and sodium silicate.

Aluminum oxide in a hardened latex solution.

Oxidation inhibitors and reducing agents.

Maintenance personnel will visually examine the operation of machines having brushes incorporating my invention. Upon one or more bright stripes appearing on the collector surface, maintenance and operating personnel should have at least one week to shut down the machine and change out the brushes. Upon replacement, brushes are shaped on the lower end to match the curvature of the collector surface, and the collector surface film is removed to bare metal. A new film forms over the entire utilized portion of the collector surface, with the operation of the replacement brushes covering the previous marking by the marking substance of the replaced brushes.

What is claimed is:

1. An electrical brush having a non-destructive wear indicator, comprising:

a. an electrical brush having an end which contacts a collector surface and an end which is opposite the end which contacts the collector surface; and b. means for removing a film from the collector surface without damaging the collector surface as the collector surface rotates relative to said brush, wherein said means for removing a film from the collector surface is present within said brush near said end of said brush which is opposite the end which contacts the collector surface, and which extends within said brush generally perpendicularly relative to the surface of the collector surface which the brush contacts, and extends toward the collector surface and the end of the brush which contacts the collector surface, and extends within said brush for a material length to a point which is beyond a required minimum length of said brush.

2. An electrical brush having a non-destructive wear indicator as described in claim 1, wherein said means for removing a film from a collector surface comprises an abrasive material.

3. An electrical brush having a non-destructive wear indicator as described in claim 1, wherein said means for removing a film from a collector surface is a non-electrically conductive material.

4. An electrical brush having a non-destructive wear indicator as described in claim 1, wherein said means for removing a film from a collector surface comprises a resilient material.

5. An electrical brush having a non-destructive wear indicator as described in claim 1, wherein said means for removing a film from a collector surface does not comprise metal.

6. An electrical brush having a non-destructive wear indicator as described in claim 1, wherein said means for removing a film from a collector surface is not a wire.

7. An electrical brush having a non-destructive wear indicator, comprising an electrical brush having marking means for removing a film from a collector surface without harming said collector surface as said collector surface rotates relative to said brush and contacts said marking means, wherein said marking means comprises an abrasive material in combination with a resilient material.

8. An electrical brush having a non-destructive wear indicator as described in claim 7, wherein said marking means is present within an upper portion of said brush above a required minimum length of said brush, and extends toward a lower portion of said brush and beyond a point which is the required minimum length of said brush, but not to a lower end of said brush, and wherein a surface of said lower portion of said brush contacts said collector surface, and wherein said marking means comprises an abrasive material in combination with a resilient material.

9. An electrical brush having a non-destructive wear indicator, comprising:

a. an electrical brush having an end which contacts a collector surface and an end which is opposite the end which contacts the collector surface; and b. means for removing a film from less than one-third of the collector surface without damaging the collector surface as the collector surface rotates relative to said brush, wherein said means for removing a film from the collector surface is present within said brush at said end of said brush which is opposite the end which contacts the collector surface, and which extends within said brush toward the collector surface and the end which contacts the collector surface and extends within said brush for a material length to a point which is beyond a the required minimum length of said brush.

10. An electrical brush having a non-destructive wear indicator as described in claim 9, wherein said means for removing a film from a collector surface comprises an abrasive material.

11. An electrical brush having a non-destructive wear indicator as described in claim 9, wherein said means for removing a film from a collector surface is a non-electrically conductive material.

12. An electrical brush having a non-destructive wear indicator as described in claim 9, wherein said means for removing a film from a collector surface comprises a resilient material.

13. An electrical brush having a non-destructive wear indicator as described in claim 9, wherein said means for removing a film from a collector surface does not comprise metal.

14. An electrical brush having a non-destructive wear indicator as described in claim 9, wherein said means for removing a film from a collector surface comprises an abrasive material and a resilient material.

* * * * *